United States Patent Office 3,832,317
Patented Aug. 27, 1974

3,832,317
PROCESS FOR REDUCING ACRYLIC ESTER MONOMER RESIDUES IN ACRYLATE LATICES
Bela K. Mikofalvy, 327 Erieview Blvd., Sheffield Lake, Ohio 44054, and Donald P. Knechtges, 1556 S. Durkee Road, Grafton, Ohio 44044
No Drawing. Original application Sept. 14, 1970, Ser. No. 72,106. Divided and this application Apr. 21, 1972, Ser. No. 246,388
Int. Cl. C08f 29/46
U.S. Cl. 260—29.6 RB  4 Claims

ABSTRACT OF THE DISCLOSURE

By including a small amount of a vinyl halide monomer in an acrylic ester emulsion polymerization which may additionally contain one or more other polymerizable comonomers it is possible to obtain improved acrylate polymer latices wherein acrylic ester monomer residues are significantly reduced or completely eliminated so that the latex and the isolated polymer have essentially no objectionable acrylate odor.

This is a division of the now abandoned application Ser. No. 72,106, filed Sept. 14, 1970.

BACKGROUND OF THE INVENTION

Esters of acrylic and methacrylic acids can be emulsion polymerized with a host of other comonomers. In most instances, however, at the completion of the polymerization there is a sufficient amount of the acrylic ester monomers remaining unpolymerized to impart a disagreeable odor to the polymer latex and often the resulting polymer. Even when the polymerization times are extended acrylate monomer residues persist in sufficient amounts to impart objectionable odor.

The amount of residual acrylic ester remaining unpolymerized will be markedly influenced by other comonomers included in the polymerization. For example, if acrylonitrile, vinyl acetate, styrene or similar monomers are employed which have a tendency to lower the acrylate conversion, residual acrylate may range up to 1% by weight of the total monomers charged or higher. It is generally felt that in order to obtain a polymer latex which is essentially free of acrylate odor, the acrylate residue should not exceed about 0.3% and more preferably be less than 0.2%.

It is desirable to eliminate or at least reduce these residual acrylate monomers, especially the more volatile and odoriferous lower alkyl acrylate monomers, in order to obtain essentially odorless polymer latices and polymers acceptable for most applications. This is generally accomplished by post-polymerization treatment of the latex—by subjecting the polymer latex to vacuum distillation, by steam distillation or by passing a stream of air through the hot emulsion. These techniques are time-consuming, costly and require one or more additional steps in the operation following the polymerization. It is also sometimes possible to achieve a higher conversion of the acrylic ester monomers by adding a small amount of a post-polymerization catalyst but even such treatment is not always completely effective.

It would be most advantageous to have a process whereby essentially odorless acrylate polymer latices are obtained as a result of reducing the amount of residual acrylic ester monomers without employing costly and time-consuming post-polymerization treatment of the latex. No completely acceptable process of this type has heretofore been available.

SUMMARY OF THE INVENTION

We have now discovered an improved process whereby acrylic ester monomer residues are reduced so that essentially odorless acrylate polymer latices and polymers can be obtained without subjecting the latex to separate, costly and time-consuming post-polymerization treatment. The process of this invention is useful with any emulsion polymerization of one or more acrylic ester monomers and to obtain the improvement simply requires the addition of a small amount of a vinyl halide monomer to the polymerization. The addition of the vinyl halide monomer may be made at the outset of the polymerization, when the polymerization is essentially complete or at any point during the polymerization. The amount of vinyl halide monomer charged during the polymerization can range to about 10% by weight of the total monomers with the resulting polymer containing between about 0.05% to 4.9% by weight bound vinyl halide, based on the overall polymer composition. The polymers and polymer latices obtained from acrylate polymer latices are essentially free from acrylate odor and there is no appreciable alteration of the physical properties of the acrylate polymer, in fact, superior polymer properties are often obtained. In addition to the acrylate monomers one or more other polymerizable comonomers may be included in the polymerization. The process of this invention is useful to obtain a wide range of acrylate copolymer latices characterized by the absence of objectionable residual acrylic ester monomer odor.

DETAILED DESCRIPTION

The acrylate polymer latices of this invention which are essentially free of acrylate monomer odor are obtained by including one or more vinyl halide monomers in the polymerization with the acrylate monomers and any comonomers which may be present.

In accordance with the present invention one or more vinyl halide monomers (this term being employed herein as generic to vinyl halides and vinylidene halides) are included in the emulsion with the acrylic ester monomers. The vinyl halide monomers useful for the present invention correspond to the structural formula

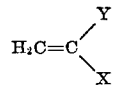

wherein X is a halogen selected from the group consisting of chlorine, bromine or fluorine and Y is hydrogen or a halogen the same as defined for X, such as vinyl chloride, vinyl bromide, vinyl fluoride, vinylidene chloride and vinylidene chlorofluoride. Vinyl chloride and vinylidene chloride are especially useful vinyl halide monomers for the purpose of this invention.

This invention is useful in any polymerization process where one or more acrylic ester monomers is polymerized in any amount. The acrylic esters have the formula

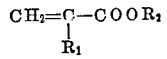

where $R_1$ is hydrogen or an alkyl radical containing from 1 to 4 carbon atoms and $R_2$ is a hydrocarbon radical containing from 1 to 12 carbon atoms such as alkyl, aryl, cycloalkyl, alkaryl or aralkyl radicals. Acrylic esters of the above type include methyl acrylate, ethyl acrylate, methyl methacrylate, ethyl methacrylate, 2-ethylhexyl acrylate, 2-ethylhexyl methacrylate, isobutyl methacrylate, isopropyl methacrylate, cyclohexyl acrylate, phenyl acrylate and the like. In addition to the above acrylate monomers, the process is also useful for the polymerization of other acrylic esters such as glycidyl acrylate, glycidyl methacrylate, ethoxyethyl acrylate, chloroalkyl acrylates, cyanoalkyl acrylates and the like. The present process is particularly useful for polymerizations of alkyl esters of acrylic or methacrylic acid, that is, where $R_1$ is hydrogen or a methyl group and $R_2$ is an alkyl radical containing from 1 to 8 carbon atoms.

One or more polymerizable comonomers preferably containing a terminal methylene grouping (H₂C=C<) may also be included with the acrylic esters being polymerized. Such comonomers include: conjugated dienes such as butadiene, isoprene and piperylene; α-olefins such as ethylene, propylene, isobutylene, butene-1 and 4-methylpentene-1; vinyl esters such as vinyl acetate; vinyl aromatics such as styrene, chlorostyrene, α-methyl styrene, vinyl toluene and vinyl naphthalene; alkyl vinyl ethers such as methyl vinyl ether, isobutyl vinyl ether, n-butyl vinyl ether and chloroethyl vinyl ether; amides such as acrylamide, methacrylamide, diacetone acrylamide and its hydroxymethyl derivatives; N-alkylol amides of α,β-olefinically unsaturated carboxylic acids such as N-methylol acrylamide, N-methylol methacrylamide, N-ethanol acrylamide and the like; N-alkoxyalkyl amides of α,β-olefinically unsaturated carboxylic acids such as N-methoxymethyl acrylamide, N-butoxyethyl acrylamide, N-butoxymethyl methacrylamide and the like; α,β-olefinically unsaturated nitriles such as acrylonitrile and methacrylonitrile; α,β-olefinically unsaturated carboxylic acids such as acrylic acid and methacrylic acid; polyfunctional monomers such as methylenebis acrylamide, ethylene glycol dimethacrylate, diethylene glycol diacrylate, divinyl benzene and allyl pentaerythritol; bis(β-haloalkyl) alkenyl phosphonates such as bis(β-chloroethyl)vinyl phosphonate; and like monomers. Such comonomers may comprise up to 99.45% by weight of the overall polymer composition.

While any of the above comonomers may be polymerized with the acrylic esters there are especially useful comonomers including vinyl acetate, styrene, acrylonitrile and methacrylonitrile and monomers which are capable of introducing reactivity (cure-sites) into the polymer such as acrylic acid and methacrylic acid, acrylamide and methacrylamide, N-methylol acrylamide and N-methylol methacrylamide. This latter group of comonomers, the so-called "reactive" monomers, are particularly useful when employed in combination with acrylic ester monomers since curable polymers can be obtained which have superior physical properties and which are useful for a wide variety of applications, both in the free polymer form and in the latex form. It has additionally and unexpectedly been shown that when, in accordance with the present invention, small amounts of a vinyl halide such as vinyl chloride are included in the polymerization of acrylic esters with one or more reactive monomers, the resulting polymers are capable of being cured at low temperatures.

The improvement of this invention is applicable to any emulsion polymerization process wherein one or more acrylic esters are polymerized so that they comprise about 0.5% to 99.95% by weight of the overall polymer composition. However, since the inclusion of comonomers is often advantageous the acrylic ester will more generally be present in the polymer from about 35% to 95% with about 4.95% to 64.95% by weight of one or more comonomers and from about 0.05% to 4.9% by weight vinyl halide. While the present invention is useful with any polymerization containing acrylic ester monomers, even in very small amounts, it is most useful for polymerizations where acrylic ester monomer is present in significant amounts since the amount of residual unpolymerized acrylate monomers is generally higher in such systems and a very significant problem.

To obtain improved low-odor acrylate polymers and polymer latices, up to about 10% by weight, based on the total monomers charged, of one or more vinyl halide monomers are added to the polymerization. It is not necessary that the total amount of the charged vinyl halide monomer be polymerized as long as the resulting polymer contains at least 0.05% bound vinyl halide. Exceptional odor-free polymers and polymer latices, wherein the polymers are curable at low temperatures, are obtained when the polymer contains at least 0.5% vinyl halide.

A great deal of flexibility is permitted in the process of the present invention for incorporating the vinyl halide monomer. The vinyl halide monomer may be charged in the conventional manner at the outset of the polymerization and copolymerized with the acrylic ester and any comonomers which may be present. Also, the vinyl halide monomer may be overpolymerized or grafted onto an acrylic ester base polymer by charging the vinyl halide to the polymerizer after a substantial portion of the acrylic ester monomer and any comonomers have already been polymerized. Typically such overpolymerization or grafting is commenced after about 90% conversion of the base monomers, however, the vinyl halide can be charged at any point during the polymerization. It is also possible to reduce the residual acrylate monomer content of a previously polymerized latex to an acceptable level by subsequently adding the vinyl halide monomer to the latex so that it is overpolymerized. The latex may be stored for prolonged periods before overpolymerization of the vinyl halide is commenced. If it is necessary, additional initiator may be added to enhance such overpolymerization. Residual acrylate levels of 0.2% by weight or below are obtained employing either copolymerization or overpolymerization techniques.

The process is useful for any acrylic ester polymerization conducted in an aqueous medium. The polymer latices may contain up to as much as 75% by weight total solids. The aqueous medium may be emulsifier-free but in most instances one or more suitable emulsifiers, generally of the anionic and nonionic types, will be employed. Excellent results and highly stable latices which are essentially free of coagulum are obtained with anionic emulsifiers. Useful anionic emulsifiers include the alkali metal or ammonium salts of the sulfates of alcohols having from 8 to 18 carbon atoms, of sulfonated petroleum and paraffin oils, of aromatic sulfonic acids and of sulfonates of dicarboxylic acid esters. When an emulsifier is used it may range up to about 6% or more by weight based on the total monomers charged and may be charged entirely at the outset of the polymerization or incrementally or by proportioning throughout the run.

The polymerizations may be conducted at temperatures ranging from about 20° C. to 100° C. Free radical catalysts including the various peroxygen compounds such as persulfates, peroxides, hydroperoxides, azo compounds and the like will be used to initiate the polymerization. Water-soluble peroxygen compounds such as hydrogen peroxide and sodium, potassium or ammonium persulfate employed by themselves or in activated redox systems are particularly advantageous for these polymerizations. The amount of initiator will generally range between about 0.1% to 3% by weight based on the total monomers. The initiator may be charged throughout the polymerization or entirely at the outset of the polymerization.

While the process is not limited to a specific emulsion polymerization technique it has been found particularly useful in carrying out the charge to pre-emulsify one or more of the monomers. The reactor is charged with an amount of water, a portion of the emulsifier and a portion of the initiator sufficient to initiate the polymerization. The reactor is then heated to a temperature sufficient to initiate the polymerization and an amount (up to about 15%) of a monomer premix containing the monomers, water and emulsifier charged to the reactor. After the initial monomer charge has been allowed to react for a period of time the remainder of the monomer premix is proportioned into the reactor. The rate of proportioning is governed by the polymerization temperature, the initiator system and the monomers being polymerized. At the completion of the proportioning more initiator is added and the reactor and the latex heated with agitation for an additional period. If overpolymerization of the vinyl halide monomer is desired, the vinyl halide monomer will be charged after the completion of the proportioning or at some point prior to the completion of the proportioning step. The reactor is then cooled and the latex filtered to remove any coagulum formed during the polymerization. If the polymer is to be isolated from the latex it may be recovered by conventional coagulation employing alcohol or salt-acid techniques or employing any of the known freeze coagulation methods.

Since the polymers obtained by the present process have a wide range of compositions and widely divergent physical properties, they are useful for many applications including impregnating and coating paper, nonwovens or textile fabrics (synthetic or natural), as adhesives and binders, as metal coatings and abrasion coatings, and the like. Polymer latices obtained when an acrylic ester is polymerized with one or more reactive comonomers and a vinyl halide monomer are particularly useful for paper and nonwoven fabric saturation applications since the resulting saturated compositions are capable of being cured at temperatures lower than has been previously possible without the use of external cross-linking agents. Low temperature curability, in addition to giving improved physical properties, results in increased production rates, improves the economics and also eliminates or minimizes objectionable discoloration often obtained when polymers are cured at elevated temperatures. The rubbery polymers are useful as foams and as compositions suitable for gaskets, footwear, flooring and the like.

The following Examples illustrate the invention more fully. In these Examples all parts and percentages are on a weight basis unless indicated to the contrary.

To demonstrate the advantage of the present process, the residual acrylate content of the latex was quantitatively determined by reacting the acrylate monomer with a known amount of dodecylmercaptan under basic conditions and then back-titrating employing conventional iodometric titration. For convenience, when calculating the percent residual acrylate for these Examples the assumption is that all the available unsaturation in the latex is due to unpolymerized acrylic ester monomers. Thus, it is possible and very likely where one or more comonomers have been included in the polymerization that the percent residual acrylate will be even lower than has been stated, but in no event will it be higher than the figure reported.

EXAMPLE I

A pressure vessel was charged with 66 parts water, 0.5 part tetrasodium pyrophosphate electrolyte, 0.03 part sodium lauryl sulfate emulsifier, 0.45 part potassium persulfate and 0.10 part sodium metabisulfite. The reactor was evacuated three times to 100 mm. mercury with the last vacuum being broken with vinyl chloride. The reactor and its contents were then heated to about 50° C. and charged with about 1% of a monomer premix comprised of 30 parts water, 1.97 parts sodium lauryl sulfate emulsifier, 93 parts n-butyl acrylate, 2 parts acrylic acid, 1.0 N-methylol acrylamide and about 4 parts vinyl chloride. After the initial portion of the monomer premix was charged and allowed to react for a short time the remaining monomer premix was proportioned into the reactor over a period of four hours. At the completion of the proportioning 0.05 part potassium persulfate dissolved in 1 part water was added and the latex agitated at about 50° C. for an additional 6 hours. The reactor was allowed to cool and the latex containing 49.9% total solids and having a pH of 4.4 recovered after filtering. The latex had excellent stability with essentially no coagulum. Analysis of the polymer indicated 1.96% chlorine which corresponds to 3.5% bound vinyl chloride. The latex contained 0.05% residual n-butyl acrylate by analysis and was essentially odorless.

When a similar polymerization of the above Example was conducted except that it contained no vinyl chloride and was polymerized at 80° C., the resulting latex had a strong acrylate monomer odor and analysis showed 0.5% residual n-butyl acrylate.

EXAMPLES II–V

A series of polymerizations were conducted in accordance with the present invention employing a variety of useful comonomers in addition to the acrylic ester and vinyl halide. The polymerizations were conducted following the general pre-emulsification procedure described in Example I. The polymerization recipes and latex characteristics were as follows:

| Example | II | III | IV | V |
|---|---|---|---|---|
| Monomers (parts): | | | | |
| Vinyl chloride | 4 | 4 | | |
| Vinylidene chloride | | | 3 | 4.5 |
| n-Butyl acrylate | | 90 | | |
| Ethyl acrylate | 94 | | 91 | 89.5 |
| Acrylonitrile | 3 | 3 | 3 | 3 |
| Acrylic acid | 1.2 | 2 | 1.2 | 1.2 |
| N-methylol acrylamide | 1.8 | 1 | 1.8 | 1.8 |
| Emulsifier (parts): Sodium salt of lauryl sulfate | 1.8 | 1 | 1.8 | 1.8 |
| Electrolyte (parts): | | | | |
| Tetrasodium pyrophosphate | 0.5 | 0.5 | | |
| Ammonium carbonate | | | 0.3 | 0.3 |
| Initiator (parts): | | | | |
| Potassium persulfate | 0.5 | 0.5 | | |
| Sodium metabisulfite | 0.1 | 0.1 | | |
| Ammonium persulfate | | | 0.3 | 0.3 |
| Latex pH | 4.7 | 3.6 | 5.0 | 5.0 |
| Latex total solids (percent) | 50.3 | 50.4 | 49.4 | 49.0 |
| Percent chlorine in polymer | 1.85 | 1.94 | 2.38 | 2.70 |
| Percent bound vinyl halide | 1.8 | 3.5 | 3.3 | 3.8 |
| Percent residual acrylate in latex | 0.17 | 0.13 | 0.08 | 0.08 |

The polymers obtained from these runs all had physical characteristics making the latex suitable for impregnation, saturation and coating applications. Additionally, the latices and polymers obtained after coagulation were free of any objectionable acrylate odor.

EXAMPLE VI

To demonstrate the versatility of the present process to obtain essentially odor-free polymer latices, vinyl chloride was overpolymerized onto a predominantly ethyl acrylate base polymer. The polymerization procedure employed was essentially the same as that described in Example I except that the vinyl chloride was not included in the initial monomer premix which contained 94 parts ethyl acrylate, 3 parts acrylonitrile, 1.2 parts acrylic acid, 1.8 parts N-methylol acrylamide emulsified in the conventional manner. Instead, 2 parts vinyl cloride was charged to the reactor at the completion of the proportioning of the monomer premix. The total water employed in the polymerization was 95 parts; the initiator (total) was 0.24 part ammonium persulfate; the emulsifier (total) was 1.8 parts sodium lauryl sulfate; and 0.3 part ammonium carbonate was employed as an electrolyte. The overpolymerization was carried out at about 80° C. for seven hours. The coagulum free latex (about 46.9% total solids) contained only 0.18% residual ethyl acrylate. There was no detectable acrylate odor present in either the latex or the polymer obtained therefrom.

EXAMPLE VII

To demonstrate the improvement obtained when even small amounts of vinyl chloride are included in acrylate polymerizations, 84 parts ethyl acrylate, 10 parts styrene, 3 parts glycidyl methacrylate and 1.5 parts acrylic acid were polymerized with 1.5 parts vinyl chloride in accordance with the procedure described in Example I. The polymer contained 2.8% bound vinyl chloride by analysis and the latex (51.8% T.S.) had a slight acidic odor, however, there was no detectable ethyl acrylate odor. Analysis of the latex showed only 0.02% residual ethyl acrylate present in the latex.

The resulting latex was diluted to about 15% total solids and 10 mil flat paper floated on the latex for ten seconds on each side. The saturated paper was then dripdried at room temperature and samples cured over a range of temperatures from room temperature to 325° F. Tensile strengths were measured for the dry paper samples. The following data were obtained for 1" x 6" samples with an Instron Tensile Tester at a pull rate of 5 cm. per minute:

| | Tensile strength (lbs./in.) |
|---|---|
| Room temperature cure | 42 |
| 5 min. cure at 225° F. | 42 |
| 5 min. cure at 250° F. | 43.5 |
| 5 min. cure at 275° F. | 42.5 |
| 3 min. cure at 325° F. | 45 |

Films were cast from the above polymer latex by thickening the latex to a sufficient viscosity to enable a 15 mil film to be cast with a drawbar on a glass plate. The films were dried at room temperature, stripped from the plates and cured at temperatures up to 300° F. Physical properties of the films were measured on 1" x 6" samples with an Instron Tensile Tester at a pull rate of 20" per minute. Physical properties obtained for the cured samples were as follows:

| | Ultimate tensile | 100% modulus | 300% modulus |
|---|---|---|---|
| Room temperature cure | 635 | 70 | 120 |
| 5 min. cure at 250° F | 617 | 60 | 90 |
| 5 min. cure at 275° F | 585 | 60 | 90 |
| 5 min. cure at 300° F | 580 | 60 | 90 |

The ability of these polymers to be cured at low temperatures is significant since the polymers tend to degrade at elevated temperatures. The degradation results in a reduction of the physical properties and a very substantial discoloration. For example, when the polymer films were heated at 300° F., the reflectance dropped from 80 to 65 after just one hour.

When the above polymerization was repeated using the same monomers except that 0.8 part vinyl chloride was charged to the polymerizer with the ethyl acrylate, glycidyl methacrylate, styrene and acrylic acid and polymerized at 60° C. for 6½ hours, the resulting latex contained only 0.18% residual acrylate monomers.

We claim:
1. An aqueous acrylate polymer latex essentially free of residual acrylic ester monomer odor comprising about 35–99.95% by weight, based on the overall polymer composition, of an acrylic ester of the formula

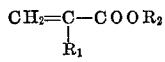

wherein $R_1$ is hydrogen or an alkyl radical containing from 1 to 4 carbon atoms and $R_2$ is a hydrocarbon radical containing from 1 to 12 carbon atoms, polymerized in aqueous emulsion with 0.05% to 4.9% by weight of a vinyl halide monomer of the formula

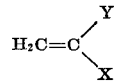

wherein X is a halogen selected from the group consisting of chlorine, bromine or fluorine and Y is hydrogen or a halogen the same as defined for X prepared by polymerizing said acrylic ester to at least 90% conversion and thereafter adding less than 10 weight parts per 100 weight parts of polymer of vinyl chloride or vinylidene chloride and the resulting latex contains less than 0.3% acrylic ester not polymerized.

2. The latex of Claim 1 wherein the vinyl halide is vinyl chloride or vinylidene chloride, the acrylic ester is a lower alkyl acrylate wherein $R_1$ is hydrogen or a methyl group and $R_2$ is an alkyl radical containing from 1 to 8 carbon atoms and the polymerizable comonomer is selected from the group consisting of vinyl acetate, styrene, acrylonitrile, methacrylonitrile, acrylic acid, methacrylic acid, acrylamide, methacrylamide, N-methylol acrylamide and N-methylol methacrylamide.

3. The aqueous acrylate polymer latex of Claim 2 containing about 35% to 95% by weight acrylic ester polymerized with about 4.95% to 64.95% by weight polymerizable comonomer.

4. The aqueous acrylate polymer latex of Claim 3 which contains up to 75% by weight total solids.

References Cited
UNITED STATES PATENTS

| | | | |
|---|---|---|---|
| 3,230,206 | 1/1966 | Albert et al. | 260—29.6 RW |
| 3,297,612 | 1/1967 | Lee et al. | 260—29.6 TA |
| 3,554,954 | 1/1971 | Rosis et al. | 260—29.6 RW |
| 3,632,543 | 1/1972 | Nakanome et al. | 260—29.6 TA |
| 3,692,726 | 9/1972 | Oehmichen | 260—29.6 TA |

WILLIAM H. SHORT, Primary Examiner

L. M. PHYNES, Assistant Examiner

U.S. Cl. X.R.

260—29.6 RW, WB, 29.6 T, TA, 86.3, 80.73, 80.8, 80.81, 884